United States Patent [19]

Williams

[11] Patent Number: 4,548,972

[45] Date of Patent: Oct. 22, 1985

[54] FLAME RETARDANT POLYAMIDE COMPOSITIONS

[75] Inventor: Ian G. Williams, Cleveland, England

[73] Assignee: Imperial Chemical Industries PLC, London, England

[21] Appl. No.: 584,906

[22] Filed: Feb. 29, 1984

[30] Foreign Application Priority Data

Mar. 17, 1983 [GB] United Kingdom ............... 8307408

[51] Int. Cl.$^4$ .................. C08L 77/00; C08K 5/34
[52] U.S. Cl. .................. 524/100; 260/DIG. 24; 524/432; 524/405; 524/411; 524/412; 524/467; 524/427; 524/514; 524/494; 524/508
[58] Field of Search ............... 524/100; 260/DIG. 24

[56] References Cited

FOREIGN PATENT DOCUMENTS 0001322 7/1979 European Pat. Off. .
1572497 7/1980 United Kingdom .

Primary Examiner—John Kight
Assistant Examiner—Marvin L. Moore
Attorney, Agent, or Firm—Cushman, Darby & Cushman

[57] ABSTRACT

A reinforced, fire retardant, polyamide composition containing (a) at least 35% by weight of a fibre-forming polyamide,
(b) 15 to 30%, by weight of glass fibres or particulate fillers,
(c) 15 to 30%, by weight of melamine demi-sulphate,
(d) at least 2.5%, by weight of a halogenated compound selected from the condensation product of 2 moles chlorocylopentadiene and 1 mole of 1,5-cyclooctadiene, brominated polystyrene, brominated polyphenylene oxide or a brominated epoxy resin, and
(e) a synergist selected from at least one of zinc borate, zinc oxide and mixtures of antimony oxide and zinc borate, wherein the concentration of oxide present is between 0 and 5%, the concentration of zinc borate is between 0 and 25%, preferably between 2 and 15% by weight and the total weight of synergist is at least 1% by weight and wherein the weight percentages of the constituents total 100%.

6 Claims, No Drawings

FLAME RETARDANT POLYAMIDE COMPOSITIONS

This invention relates to glass-reinforced polyamide compositions having a good level of fire retardancy.

European Pat. No. 1322 discloses the use of melamine demi-sulphate having the empirical formula $C_3H_6N_6.\frac{1}{2}H_2SO_4$ as a fire retardant for polyamides. The specification warns that in compositions according to the invention the presence of glass fibres should be avoided because the burning performance is seriously reduced. It has now been found possible to achieve a high level of fire retardancy in glass fibre-reinforced compositions using melamine sulphate in combinations with other specific fire retardant materials.

According to the invention there is provided a reinforced, fire retardant, polyamide composition characterised in that it contains:
  (a) at least 35% by weight of a fibre-forming polyamide,
  (b) 15 to 30%, by weight of glass fibres or particulate fillers,
  (c) 15 to 30%, preferably 16 to 27.5% by weight of melamine demi-sulphate,
  (d) at least 2.5%, preferably 3 to 10% by weight of a halogenated compound selected from the condensation product of 2 moles chlorocyclopentadiene and 1 mole of 1,5-cyclooctadiene, brominated polystyrene, brominated polyphenylene oxide or a brominated epoxy resin, and
  (e) a synergist selected from at least one of zinc borate, zinc oxide and mixtures of antimony oxide and zinc borate, wherein the concentration of oxide present is between 0 and 5%, the concentration of zinc borate is between 0 and 25%, preferably between 2 and 15% by weight and the total weight of synergist is at least 1% by weight and wherein the weight percentages of the constituents total 100%.

The composition of the invention not only exhibits excellent fire retardancy according to the standard under even more severe burning conditions. Additionally the compositions have a high level of resistance to carbonisation when subjected to excessive leakage of electrical current. Further benefits are that the composition is less prone to migration and blooming than those based on melamine or melamine cyanurate.

The fire-retardant characteristics of the composition of the invention are conveniently determined using the Underwriters Laboratories Test Standard UL94. Using the Vertical Burning Test of this Standard the compositions of the invention should have a rating of 94 V1 or better when tested on samples having a thickness of 1.6 mm both when conditioned at a relative humidity of 50% for 48 hours or at 70° C. for one week.

The tracking resistance of the compositions is conveniently determined by the method set out in the method of DIN 53480/1972 (KC Method). The preferred compositions of the invention when tested according to this method should have a comparative tracking resistance of at least 250, preferably at least 375, and more desirably at least 500, that is having a tracking resistance in the specified test of at least 250 volts and preferably at least 375 volts and more desirably at least 500 volts.

The polyamides used in the invention are polyamides having a melting point above 220° C. preferably containing a major proportion of repeating units derived from hexamethylene adipamide, hexamethylene sebacamide or caprolactam. The most suitable polymers are homopolymers of nylon 66 and nylon 6 and copolymers of these materials containing not more than 50% by weight of units other than nylon 66 or nylon 6. These other units may be, for example, of nylon 6.9 or 6.10. The preferred materials are the homopolymers of nylon 66 and nylon 6 and copolymers of nylon 66 with nylon 6.

The polyamides preferably have a number average molecular weight of at least 3000.

The halogenated compound should be used at as low a concentration as possible, compatible with obtaining the required fire retardancy. In general it should not be necessary to use more than 5% by weight of such a compound to obtain a UL94 rating of at least 94 V1 in compositions according to the invention. The ability to obtain good fire retardancy with such low levels of halogenated compound has the advantFage of reducing costs, and reducing the specific gravity of the composition when compared to prior art compositions which use halogenated additives as the sole fire retardant.

The condensation product of chlorocyclopentadiene and cyclooctadiene has the formula:

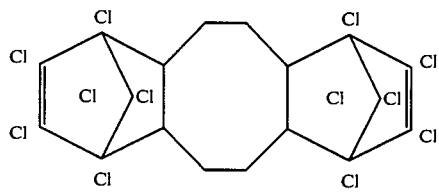

hereinafter referred to by the formula $C_{18}H_{12}Cl_{12}$.

The brominated polystyrene, brominated polyphenylene and brominated epoxy resin should have a bromine content of at least 30% by weight. Particularly suitable brominated epoxy resins are prepared by the condensation of propylene oxide and tetrabromobisphenol A. A preferred resin contains propylene oxide and tetrabromobisphenol A in the molar ratio of 3:2.

The preparation of melamine demisulphate is described in European Pat. No. 1322.

The synergist may be selected from zinc borate zinc oxide and mixtures of antimony oxide and zinc oxide when an oxide is present relatively little oxide is required to give good fire retardancy. When the oxide exceeds a concentration of 5% by weight the electrical properties of the composition are deleteriously affected. The concentration of oxide present should therefore be in the range 0.05 to 5.0% by weight. When zinc borate is included much higher levels can be tolerated without adversely affecting electrical properties. The preferred levels of zinc borate are between 2 and 15% by weight.

The zinc borate should be thermally stable at the processing temperatures of the polyamide so that it does not evolve significant amounts of volatile material when used at the processing temperature of the polyamide. This requirement is important because materials which give such volatile products can give rise to processing difficulties particularly when the composition is extruded as a lace. The preferred form of zinc borate is of the form $2ZnO.3B_2O_3.xH_2O$, where x is between 3.3 and 3.7. This material does not lose appreciable amounts of water below 300° C. The preparation of such compounds is described in British patent specification 1 184 967. The higher hydrates for example $2ZnO.3B_2O_3.7H_2O$ and $2ZnO.3B_2O_3.9H_2O$ lose water below the processing temperatures of most polyamides and are therefore unsuitable except for use with low melting point polyamides because they are difficult to blend with polyamides such a nylon 66 and nylon 6 and would present problems during melt fabrication of the compositions into shaped articles. Anhydrous zinc borate may be used but the results obtained are generally inferior to those obtained using the hydrated form $2ZnO.3B_2O_3.xH_2O$ where x is between 3.3 and 3.7, particularly $2ZnO.3B_2O_3.3.5H_2O$.

The compositions may be produced by intimately blending the glass fibres and fire retardant additives in the presence of molten polyamide. Suitably, the compounding can be carried out in a screw extruder.

The glass fibres used are preferably commercially available glass fibres coated with size compositions which maximise the mechanical properties of glass reinforced polyamide compositions. These sizes will normally include a silane coupling agent.

The particulate fillers used in the invention include any of the known mineral fillers such as talc, clay, limestone, kaolin, wollastinite and mica. These may be treated with silane coupling agents to improve bonding between the filler and polyamide.

Mixtures of glass fibres and particulate fillers may be used.

In addition to the polyamide and the specified ingredients the compositions of the invention may contain any of the auxiliary materials which are known for use in polyamide compositions. These include heat and light stabilisers, pigments, lubricants and mould release agents.

The compositions of the invention are suitable for moulding general purpose electrical components or other components where fire retardancy is important.

The invention is further illustrated by reference to the following examples.

EXAMPLE 1

The compositions listed in Table 1 were prepared by dry blending the ingredients of each composition with polyamide granules of 90:10 nylon 66:nylon 6 copolymer prior to feeding them to a 50.8 mm single screw extruder, filled with by-pass venting, maintained at a temperature between 250° and 270° C. The melt compounded mixture was extruded as a lace, quenched in a water bath and cut into granules. After drying, the products were injection moulded into test pieces for fire retardancy, electrical and mechanical property measurements. These properties are listed in Table 1 in which the concentrations of all ingredients are expressed as percent by weight of the total composition.

TABLE 1

| Composition | Glass fibre | Melamine sulphate | $C_{18}H_{12}Cl_{12}$ | Synergist | Fire retardancy performance (sec) | | | | UL94 rating | Kc (volts) | Tensile strength $MN/m^2$ | Impact strength (kJ) | |
|---|---|---|---|---|---|---|---|---|---|---|---|---|---|
| | | | | | 50% RH/48 hours | | 70° C./1 week | | | | | UNIS | IS ¼ |
| | | | | | max | mean | max | mean | | | | | |
| 1 | 25 | 17.5 | 3 | 1.5 ZnO | 9 | 4.1 | 12 | 6.1 | V1 | 325 | 120 | 28 | 5 |
| 2 | 20 | 17.5 | 3 | 2 ZB[1] | 16 | 6.8 | 18 | 11.2 | V1 | 250 | 137 | 40 | 5 |
| 3 | 20 | 20 | 4 | 3 ZB | 5 | 2.8 | 10 | 3.9 | V0 | 250 | 129 | 32 | 5 |
| 4 | 20 | 17.5 | 3 | 6 ZB | 12 | 6.2 | 28 | 13.3 | V1 | — | — | — | — |
| 5 | 20 | 25 | 4 BE[2] | 1 $Sb_2O_3$ / 3 ZB | 10 | 2.1 | 6 | 2.0 | V0 | 300 | 126 | 31 | 4 |
| 6 | 25[3] | 17.5 | 3 | 1.5 ZnO | 27 | 17.8 | 30 | 15.1 | V1 | — | — | — | — |

[1]ZB denotes zinc borate formula $2ZnO.3B_2O_3.3.5H_2O$.
[2]BE denotes a brominated epoxy resin containing 48% by weight of bromine.
[3]Talc used instead of glass fibre.

COMPARATIVE EXAMPLE

The compositions listed in Table 2 were prepared according to the procedure of Example 1. The fire retardancy of these compositions is included in Table 2.

These results show that inadequate fire retardancy is obtained using compositions which differ from those according to the invention.

TABLE 2

| Composition | Glass fibre | Melamine sulphate | $C_{18}H_{12}Cl_{12}$ | Synergist | Fire retardancy performance (sec) | | | | UL94 rating |
|---|---|---|---|---|---|---|---|---|---|
| | | | | | 50% RH/48 hours | | 70° C./1 week | | |
| | | | | | max | mean | max | mean | |
| A | 25 | 17.5 | 3 | 1 $Sb_2O_3$ | — | — | 49 | 15.8 | V1 fail |
| B | 20 | 20 | 2 | 1 ZnO | — | — | 40 | 19.8 | V1 fail |
| C | 20 | 15 | 3 | 1.5 ZnO | 38 BD | 18.9 | >60 | 50 | V1 fail |
| D | 20 | 20 | 2 | 6 ZB[1] | 27 | 17.8 | 38 BD | 22.0 | V2 fail |

[1]The zinc borate used had the formula $2ZnO.3B_2O_3.3.5H_2O$.

I claim:
1. A reinforced, fire retardant, polyamide composition characterised in that it contains:
   (a) at least 35% by weight of a fibre-forming polyamide,
   (b) 15 to 30%, by weight of glass fibres or particulate fillers,
   (c) 15 to 30%, by weight of melamine demi-sulphate,
   (d) at least 2.5% but no more than 10%, by weight of a halogenated compound selected from the condensation product of 2 moles chlorocyclopentadiene and 1 mole of 1,5-cylooctadiene, brominated polystyrene, brominated polyphenylene oxide or a brominated epoxy resin, and
   (e) a synergist selected from at least one of zinc borate, zinc oxide and mixtures of antimony oxide and zinc borate, wherein the concentration of oxide present is between 0 and 5%, the concentration of zinc borate is between 0 and 25%, and the total weight of synergist is at least 1by weight and wherein the weight percentages of the constitutents (a), (b), (c), (d) and (e) total 100%.

2. A reinforced fire retardant polyamide composition according to claim 1 wherein the concentration of melamine demi-sulphate is between 16 and 27.5% by weight.

3. A reinforced, fire retardant polyamide composition according to either of claim 1 or claim 2 in which the concentration of condensation product (d) is between 3 and 10% by weight.

4. A reinforced, fire retardant polyamide composition according to claim 3 wherein the concentration of condensation product (d) is not greater than 5% by weight of the total composition.

5. A reinforced, fire retardant polyamide composition according to any one of claims 1 to 4 in which the concentration zinc borate, when present as synergist, is between 2 and 15% by weight of the total composition.

6. A reinforced, fire retardant polyamide composition according to any one of claims 1 to 4 in which the concentration of oxide, when present as synergist, is between 0.05 and 5% by weight of the total composition.

* * * * *